US009647755B1

(12) United States Patent  
Johnson

(10) Patent No.: US 9,647,755 B1  
(45) Date of Patent: May 9, 2017

(54) LIGHT AUGMENTED SYSTEM AND METHOD FOR SECURE DEVICE PAIRING

(71) Applicant: GOOGLE INC., Mountain View, CA (US)

(72) Inventor: Caitlin Johnson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 290 days.

(21) Appl. No.: 14/619,929

(22) Filed: Feb. 11, 2015

(51) Int. Cl.  
*H04B 10/00* (2013.01)  
*H04B 10/114* (2013.01)

(52) U.S. Cl.  
CPC ......... *H04B 10/1143* (2013.01); *H04B 10/22* (2013.01)

(58) Field of Classification Search  
CPC .............. H04B 10/116; H04B 10/1143; H04B 10/1149; H04B 10/60; H04B 10/112; H04W 4/008; H04W 76/023  
USPC ........ 398/118, 119, 127, 128, 130, 131, 115, 398/172, 135, 136; 455/41.1, 41.2, 41.3, 455/566  
See application file for complete search history.

(56) References Cited

U.S. PATENT DOCUMENTS

| | | | |
|---|---|---|---|
| 8,260,261 B2 | 9/2012 | Teague et al. | |
| 8,521,086 B2 | 8/2013 | Bradley et al. | |
| 8,542,834 B1 | 9/2013 | Feikis et al. | |
| 9,392,637 B1* | 7/2016 | Lesner | H04L 63/0823 |
| 2008/0113618 A1 | 5/2008 | De Leon et al. | |
| 2014/0281547 A1 | 9/2014 | Modzelewski et al. | |
| 2015/0065202 A1* | 3/2015 | Lee | H04M 1/185 |
| | | | 455/566 |
| 2016/0050700 A1* | 2/2016 | Gu | H04B 10/116 |
| | | | 398/118 |

* cited by examiner

*Primary Examiner* — Hanh Phan  
(74) *Attorney, Agent, or Firm* — Brake Hughes Bellermann LLP

(57) ABSTRACT

A light augmented system for securely pairing a computing device and a peripheral device may include a light emitting device provided in the peripheral device, and a light receiving device provided in the computing device. A sensing device may be included in one of the computing device or the peripheral device, and a magnet may be included at a specific location in the other of the computing device or the peripheral device. Upon detection by the sensing device of the magnet at the specific location and confirmation that the computing device and the peripheral device are in a secure closed position, a secure pairing operation may be carried out between the peripheral device and the computing device as the light emitting device transmits a pattern of light to the computing device, the pattern of light defining a bit stream of information corresponding to a pairing code known by the peripheral device and the computing device.

18 Claims, 10 Drawing Sheets

LIGHT AUGMENTED SYSTEM AND METHOD FOR SECURE DEVICE PAIRING

FIELD

This relates, generally, to pairing of electronic devices, and in particular, to secure pairing of electronic devices.

BACKGROUND

A computing device may include various components that are selectively paired so as to operate together. For example, a computing device may include a base device, such as a CPU, and a peripheral device, such as, for example, a keyboard, capable of communicating with and operating together with the base device for user input and output and other such functions. Expansion in the field of computing devices to include portable devices such as, for example, laptop computers, convertible computers, tablet computers, mobile phones with smartphone capabilities, and other such devices, drives a need for faster and more secure and efficient pairing of base devices with peripheral devices.

SUMMARY

In one aspect, a method of pairing a first electronic device and a second electronic device may include detecting the first electronic device at a secure pairing position with respect to the second electronic device, activating a light emitting device of the second electronic device and transmitting a pattern of light defining a bit stream of data corresponding to a secret code known by the first electronic device and the second electronic device, receiving the bit stream of data at a light receiving device of the of the first electronic device, the light receiving device being directly aligned with the light emitting device, and pairing the first electronic device and the second electronic device upon confirmation by the first electronic device that the bit stream of data transmitted by the light emitting device of the second electronic device corresponds to the secret code known by the first electronic device.

In another aspect, a computing system, including a plurality of electronic devices configured to be selectively paired, in accordance with embodiments as broadly described herein, may include a computing device and a peripheral device configured to be selectively paired, a light emitting device included in the peripheral device, a light receiving device included in the computing device, at least one magnet included in one of the peripheral device or the computing device, at least one sensing device included in the other of the peripheral device or the computing device, and a controller included in at least one of the computing device or the peripheral device, wherein, when the computing device is in a secure pairing position with respect to the peripheral device such that the at least one sensing device detects the at least one magnet at a prescribed location, the controller is configured to initiate a pairing operation between the computing device and the peripheral device.

The details of one or more implementations are set forth in the accompanying drawings and the description below. Other features will be apparent from the description and drawings, and from the claims.

DETAILED DESCRIPTION

Figure 1:
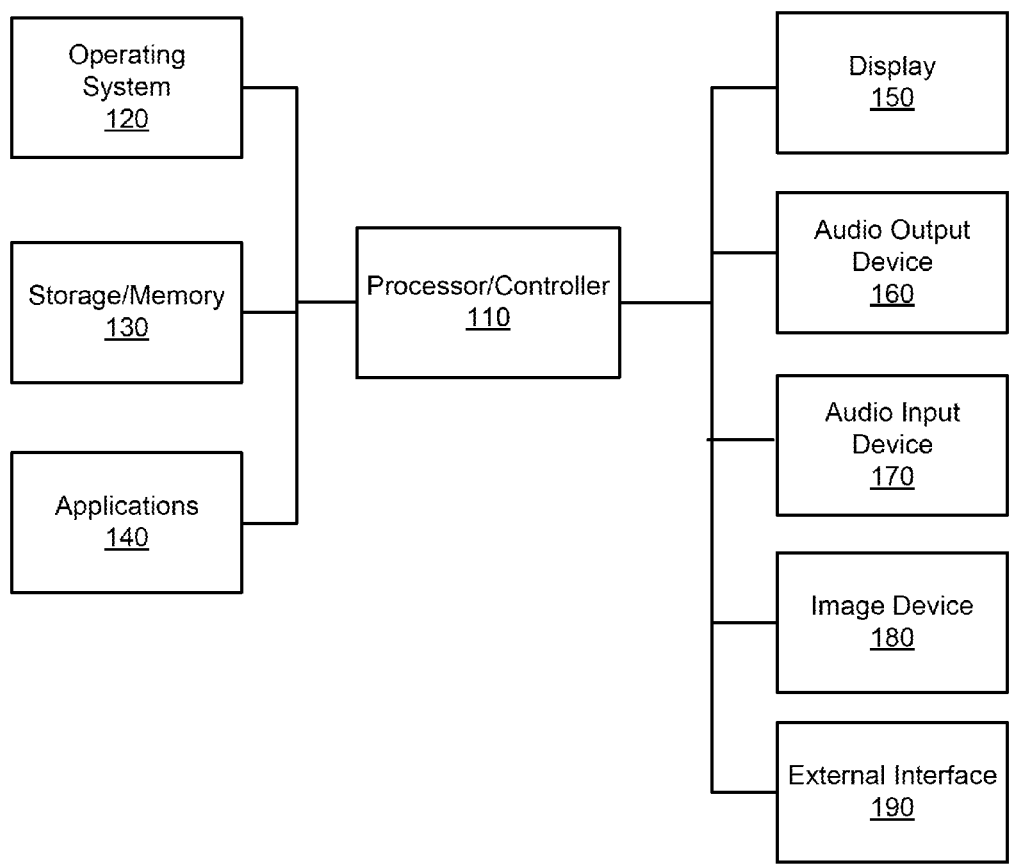
FIG. 1 is a block diagram of an example computing device, in accordance with an embodiment as broadly described herein.

Pairing one electronic device to another, to, for example, enable use of a peripheral device with a base device, may involve the passing of a shared code or shared secret before communication may be established between the devices. In one example, this passing of the shared code or shared secret may involve a user reading a code from the first device and manually entering the code into the second device to confirm the user's intent to pair the two devices and establish identity. This manual pairing of devices may be somewhat time consuming, and may introduce security vulnerabilities in that a shared code entered, transmitted and received in this manner may be easily intercepted. In another example, the second device may be set to automatically detect the presence of the first device, and to automatically request (manual) entry of the shared code or shared secret, or may be set so that the first device automatically transmits the shared code or shared secret to the second device upon their mutual detection. This approach may eliminate the need for the user to initiate pairing, but may still present an opportunity for the shared code or shared secret to be intercepted, particularly when the shared code or shared secret is manually entered, or wirelessly transmitted between the devices.

In an example implementation in which a system for secure device pairing, as embodied and broadly described herein, is applied to, for example, a tablet computing device, the system may provide for secure, efficient and uncomplicated pairing between the tablet computing device and multiple different peripheral devices, such as, for example, keyboard devices, and/or pairing of a peripheral device, such as, for example, a keyboard device with multiple different tablet computing devices. For example, a tablet computing device may be paired with any one of a plurality of keyboard devices of a particular product family, and/or a keyboard device may be paired with any one of a plurality of tablet computing devices of a particular product family. In one example embodiment, the system may generate flashes of light to provide a bit stream for passing information from, for example, the keyboard device, to be received only by the intended tablet computing device, for transmitting the shared code or shared secret via a dedicated path not accessible to an external entity, without separate, complicated and time consuming user intervention, and without exposing the shared code or shared secret.

Simply for ease of discussion and illustration, a tablet computing device and associated peripheral device(s) including a keyboard base will be discussed hereinafter with respect to implementation of a system and method as embodied and broadly described herein. However, these features may be similarly applied to pairing of peripheral device(s) with other types of computing devices, such as, for example, a laptop computing device, a convertible computing device, a smartphone computing device, and other such computing devices capable of pairing and interfacing with other peripheral devices.

A tablet computing device may be selectively connectable to a plurality of peripheral devices. As shown in FIG. 1, in some embodiments, such a tablet computing device may include, for example, a processor/controller 110 invoking an operating system 120 and a storage device or memory 130 to run various applications 140, a display 150, an audio output device 160 including, for example, a speaker and/or a headphone port, an audio input device 170 including, for example, a microphone, an image device 180 capturing still and/or moving images such as, for example, a camera or webcam, an interface device 190 including, for example a communication port and/or interface port such as, for example, one or more USB ports, HDMI ports and the like, and other such components.

Figure 2:
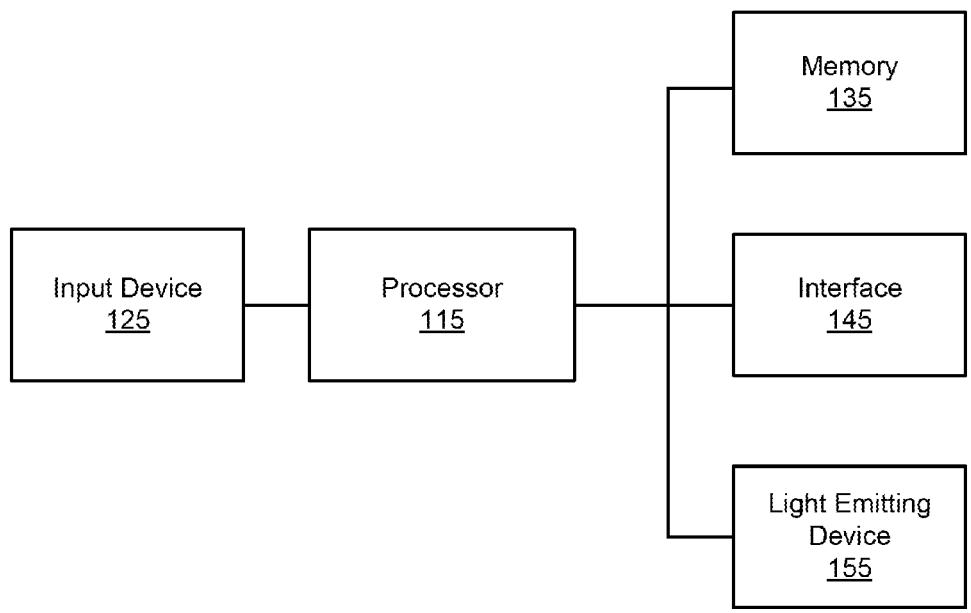
FIG. 2 is a block diagram of an example peripheral device capable of operation with the example computing device shown in FIG. 1, in accordance with an embodiment as broadly described herein.

As shown in FIG. 2, in some embodiments a keyboard to which a tablet of a tablet computing device may be selectively connectable may include, for example, a processor 115, an input device 125, such as, for example, a keyboard structure, receiving external input to be processed by the processor 115, a memory 135, an interface device 145 providing for communication with one or more external devices, a light emitting device 155 emitting light in response to a signal from the processor 115, and other such components.

Figure 3A:
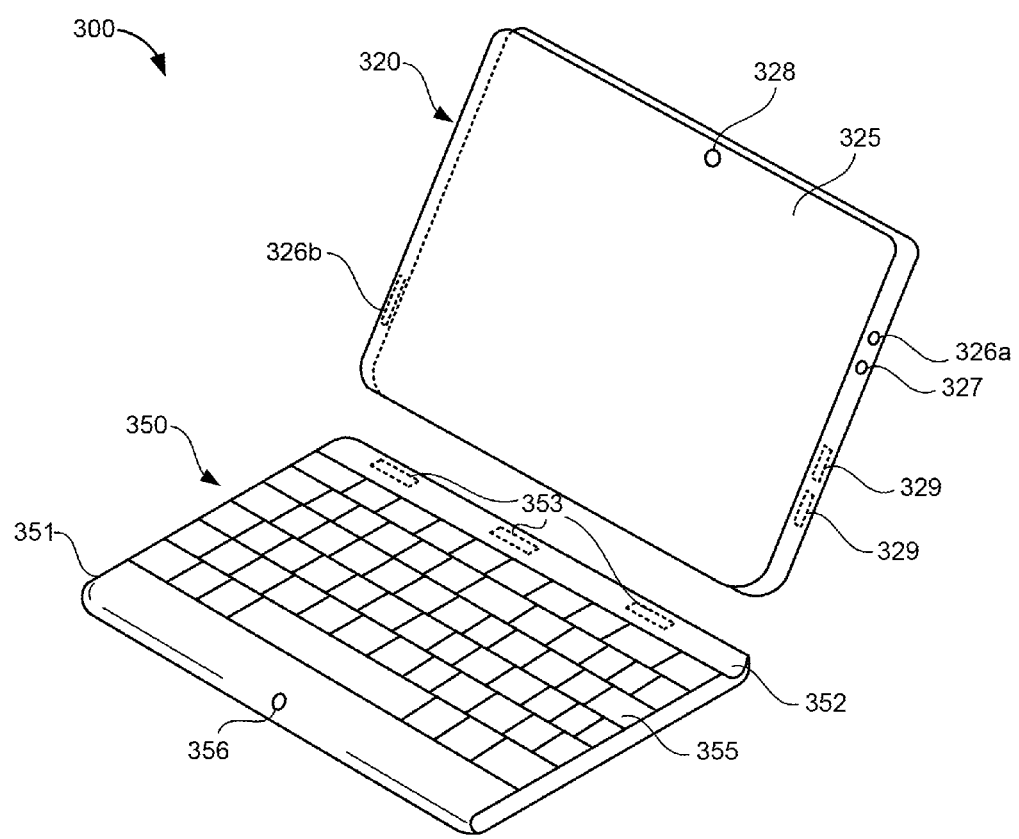
FIGS. 3A-3D are perspective views of an example implementation of a tablet computing device including a light augmented pairing system, in accordance with an embodiment as broadly described herein.
Figure 3B:
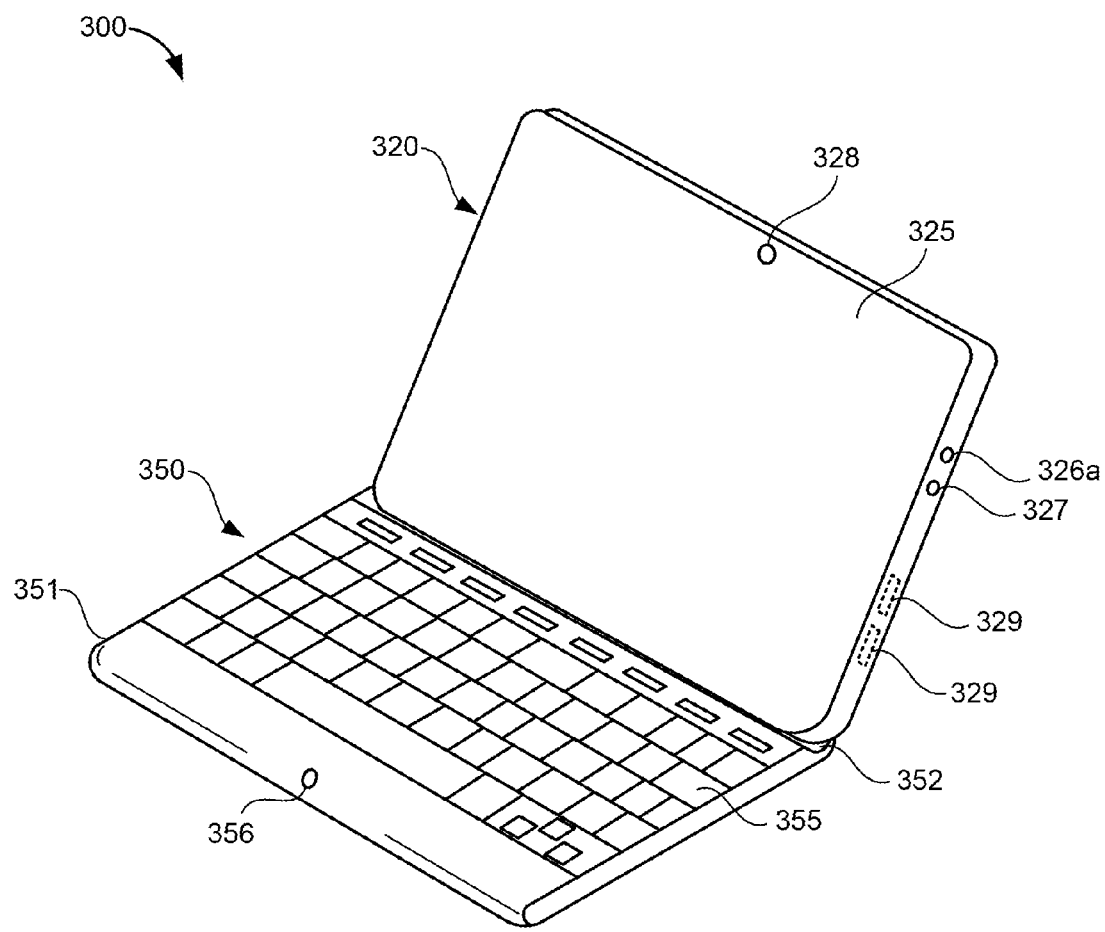
Figure 3C:
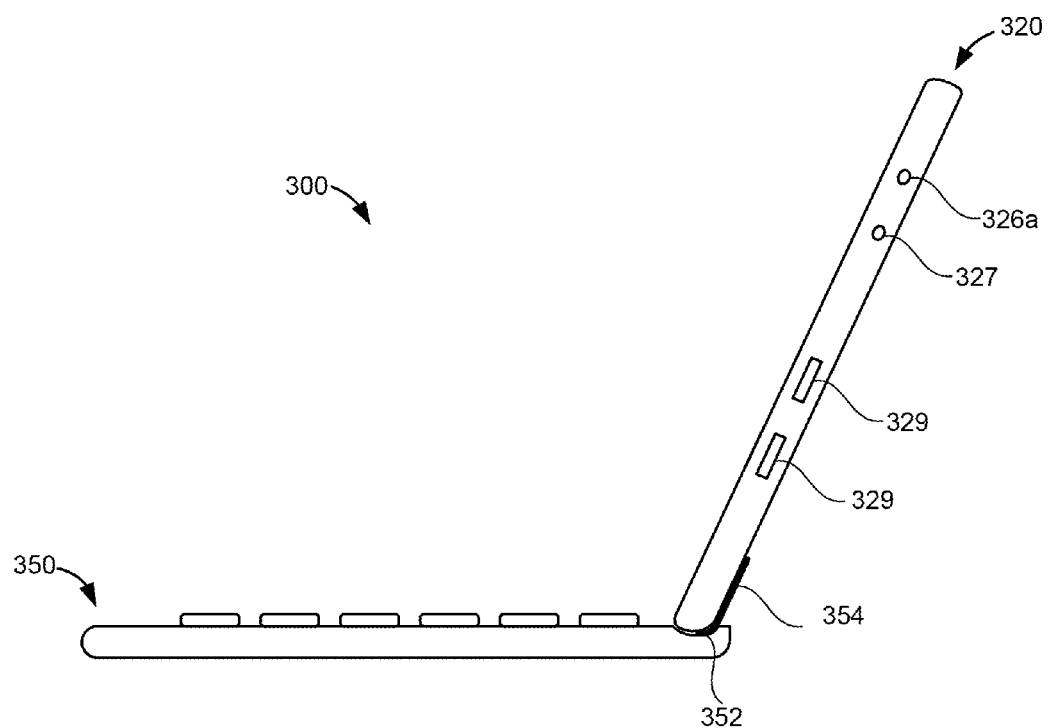
Figure 3D:
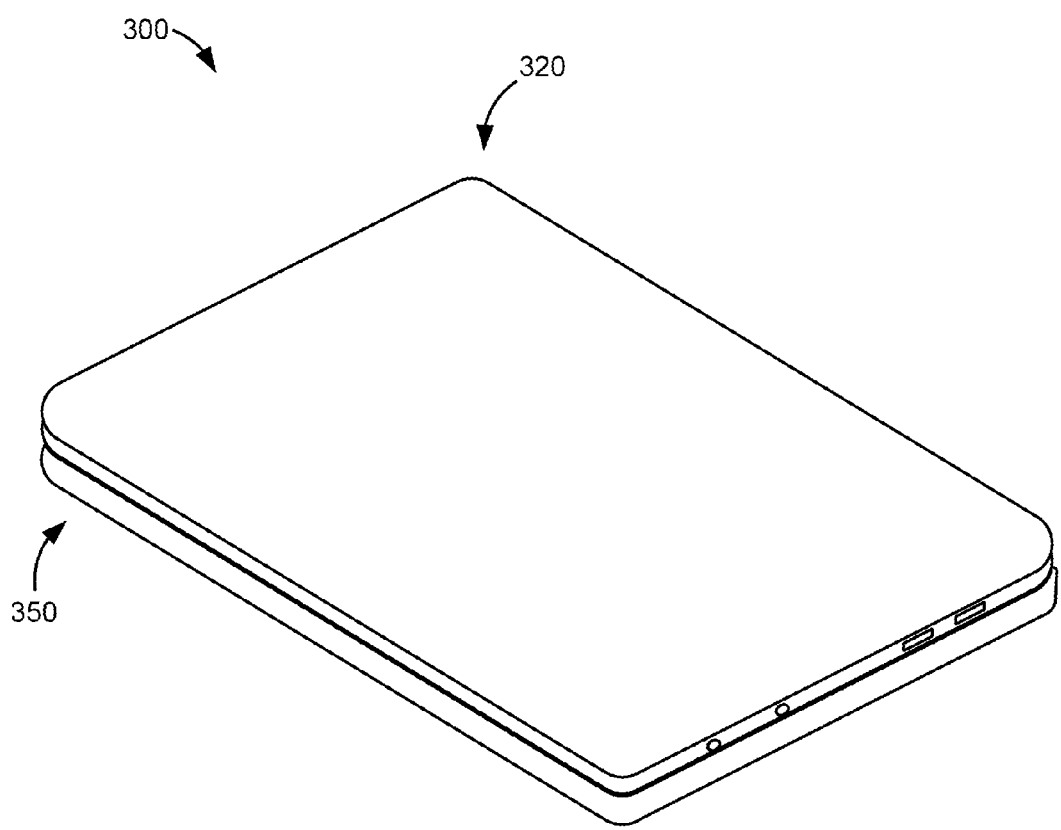

In the example implementation shown in FIGS. 3A-3D, a tablet computing device 300 may include a tablet 320 which may be selectively coupled to and separated from various peripheral devices, such as, for example, a keyboard 350. The tablet 320 and keyboard 350 are shown in a separated state in FIG. 3A, and in a coupled state in FIGS. 3B-3D. In an operational mode, the tablet 320 may be operably coupled to the keyboard 350 as shown in FIGS. 3B and 3C, such that the keyboard 350 forms a base for the tablet 320 and holds the tablet 320 in a substantially upright position so that the tablet 320 is easily visible to the user when using the keyboard 350 for typing. The tablet 320 may also be coupled to the keyboard 350 in a standby mode, or a storage mode, as shown in FIG. 3D. In the standby mode, the tablet 350 may be placed, display side down, facing the key surface of the keyboard 350. Thus, in some circumstances, the tablet 320 may also be referred to as a "lid" and the keyboard 350 may also be referred to as a "base." In some embodiments, when coupled to the base, the tablet 320 may be moveable and/or rotatable with respect to the base, to a plurality of different angular positions and/or viewing angles with respect to the base. For example, in some embodiments, the tablet 320 may be coupled to the base such that the tablet 320 is rotatable about X, Y and Z axes of rotation with respect to the base.

The tablet 320 may include a display 325, one or more audio output devices including a headphone interface 326a and a speaker 326b, an audio input device including a microphone 327, one or more camera(s) 328, and one or more external interface devices 329. The keyboard 350 may include a housing 351, an input device including a plurality of keys 355 provided on a key surface of the housing 351, a groove 352 in which a corresponding edge of the tablet 320 may be selectively received, one or more magnet(s) 353 provided in the groove 352 to establish a magnetic connection with the tablet 320 received in the groove 352, and a light emitting port 356 in the key surface of the housing 351, at a position corresponding to a light emitting device 400 (see FIGS. 4A and 4B) included in the housing 351. A support panel 354 (see FIG. 3C; not shown in FIG. 3A) may be rotatably coupled to a rear edge of the groove 352, and may be rotated up and away from the key surface of the housing 351 to provide additional support to the tablet 320 received in the groove 352.

In order for the tablet 320 and keyboard 350 to function cooperatively in the operational mode, for example to allow a user input entered on the keyboard 350 to be received and registered by the tablet 320, the tablet 320 and the keyboard 350 may first undergo a pairing process. During the pairing process, a known code or secret may be shared between the two devices. In some embodiments, this may involve one of the two devices, for example, the keyboard 350 or other peripheral device, transmitting the shared code or shared secret to the other of the two devices, for example, the tablet 320.

For example, in one embodiment, the keyboard 350 may generate flashes of light in a bit stream representing the shared code or shared secret. The bit stream may be received by the tablet 320, such as, for example, by the camera 328 provided on the tablet 320, to complete the pairing process and establish communication between the two devices. This type of pairing will be described in more detail with reference to FIGS. 4A and 4B.

Figure 4A:
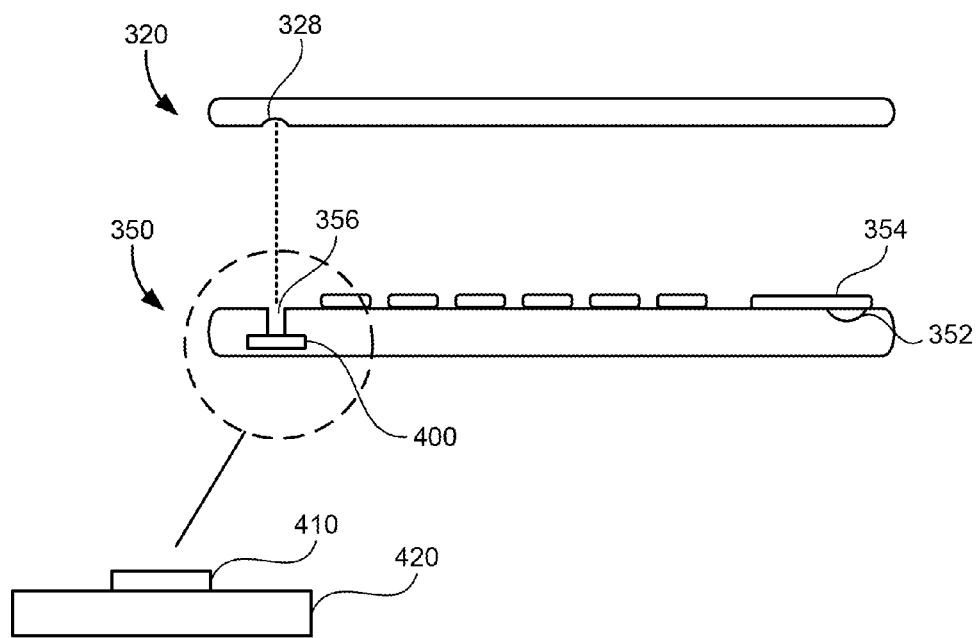
FIGS. 4A-4B are side cross sectional views of a tablet and a keyboard, illustrating a pairing configuration between a tablet and a keyboard including a light augmented pairing system, in accordance with an embodiment as broadly described herein.
Figure 4B:
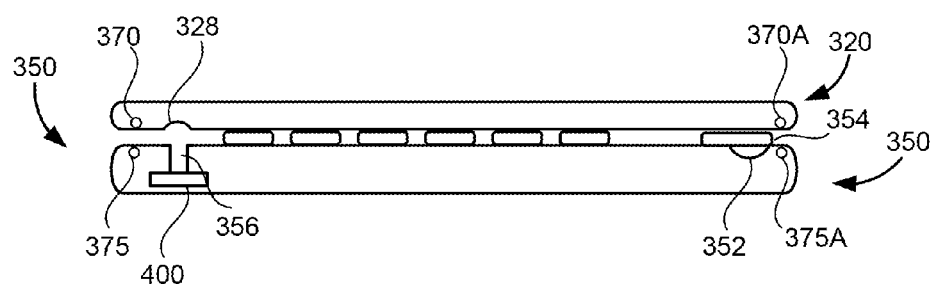

As shown in FIGS. 4A and 4B, the peripheral device, and in this example embodiment, the keyboard 350, may include a light emitting device 400. The light emitting device 400 may include, for example, one or more light emitting diodes (LEDs) 410 mounted on a substrate 420. The light emitting device 400 may be installed within an interior of the housing 351 of the keyboard 350 so that the components of the light emitting device 400 are not visible from the outside of the keyboard 350. Light emitted by the light emitting device 400 may be emitted to the outside of the keyboard 350 through, for example, the light emitting port 356 in key surface of the housing 351. The light emitting port 356 may be, for example, a channel formed through the keyboard surface of the housing 351 of the keyboard 350 to direct the light emitted by the light emitting device 400 to the outside of the keyboard 350. In some embodiments, a terminal end of the light emitting port 350 may be open to allow for the unobstructed passage of light through the terminal end of the light emitting port 356. In some embodiments, a transparent cover may extend across the terminal end of the light emitting port 356 to allow light to pass therethrough. The cover may be substantially flush with the keyboard surface of the housing 351 of the keyboard 350 so that the keyboard surface is relatively smooth and the opening and cover is substantially imperceptible.

Light emitted by the light emitting device 400, and in particular, flashes of light emitted by the light emitting device 400, may be transmitted to the outside of the keyboard 351 via the light emitting port 356. A pattern in which the flashes of light are emitted by the light emitting device 400 of the keyboard 350 may correspond to a bit stream representing the shared code or shared secret to be shared between the keyboard 350 and the tablet 320 for secure pairing of the keyboard 350 and the tablet 320. In some embodiments, the light emitted by the light emitting device 400 may be emitted with intermittent, temporal variation, to generate flashes of light over a given period of time so as to represent the shared code or shared secret. In some embodiments, the light emitted by the light emitting device may intermittently vary in intensity over a given period of time so as to represent the shared code or shared secret. The bit stream representing the shared code or shared secret may be received by the tablet 320, and in particular, the flashes of light generated by the light emitting device 400 of the keyboard 350 may be received by a light receiving device of the tablet 320, at a light receiving port of the light receiving device, such as the camera 328 of the tablet 320, so that the tablet 320 may process the received bit stream and complete the pairing process.

To facilitate the pairing process and the receipt of the flashes of light transmitted from the keyboard 350 to the table 320, the light emitting port 356 of the keyboard 350 may be aligned with the camera 328 of the tablet 320, as shown in FIG. 4A. However, when the keyboard 350 and tablet 320 are aligned in the manner shown in FIG. 4A, the shared code or shared secret may be observed or otherwise intercepted by an unauthorized external device and/or user. Further, even if security during transmission of the shared code or shared secret were not a concern, it may be difficult to manually align, and maintain manual alignment between the light emitting port 356 of the keyboard 350 and the camera 328 as the shared code or shared secret is completely and accurately transmitted. Alignment of the light emitting port 356 of the keyboard 350 with the camera 328 of the tablet 320 may be facilitated by, for example, enlarging the light emitting port 356 so that a significantly larger band of light is emitted by the light emitting device 400 via the light emitting port 356, the significantly larger band of light being more easily aligned with and intercepted by the camera 328 of the tablet 320. However, a significantly larger, expanded opening forming the light emitting port 356 may detract from an overall aesthetic appearance of the device. Further, if uncovered, a larger opening may allow foreign matter to infiltrate into the housing 351 of the keyboard 350, possibly causing malfunction of internal components, and may allow foreign matter to become lodged in the light emitting port 356 itself, blocking the full and accurate transmission of the shared code or shared secret.

In one embodiment, in order to prevent the shared code or shared secret from being observed or intercepted by an external, unauthorized device and/or user as described above, the tablet 320 and the keyboard 350 may be positioned in the standby or storage mode shown in FIG. 3D as the flashes of light representing the shared code or shared secret are transmitted from the keyboard 350 to the tablet 320. In particular, the tablet 320 and the keyboard 350 may be positioned in the standby or storage mode, with the key surface of the keyboard 350 facing the display surface of the tablet 320. Once positioned in this manner, this position may be maintained, and alignment of the light emitting port 356 of the keyboard and the camera 328 of the tablet 320 may be maintained throughout the pairing process. In some embodiments, the position of the tablet 320 and keyboard 350 may be maintained through, for example, magnetic coupling of the tablet 320 and keyboard 350.

When in the standby or storage position shown in FIG. 4B, alignment of the light emitting port 356 of the keyboard 350 and the camera 328 of the tablet 320 may be easily and consistently established and maintained without further user intervention throughout the pairing process. With the camera 328 of the tablet 320 positioned essentially directly adjacent to the light emitting port 356 of the keyboard 350, the flashes of light emitted by the light emitting device 400 of the keyboard 350 generating a bit stream representing the shared code or shared secret may be transmitted via this dedicated path only to the light receiving device, or camera 328, of the tablet 320. Because the flashes of light are shielded by the confines of the keyboard 350 and the tablet 320, with the tablet 320 positioned directly against the keyboard 350 in the standby or storage mode, the shared code or shared secret is shielded from observation by an unauthorized external device or user. Further, because the shared code or shared secret is transmitted by light, rather than, for example, key strokes or over a wifi or Bluetooth connection, the shared code or shared secret cannot be otherwise overheard or intercepted by an unauthorized external device or user.

Transmission of the shared code or shared secret using flashes of light to generate a bit stream representing the shared code or shared secret allows the shared code or shared secret to be passed directly from, for example, the keyboard device, to be received only by the intended tablet computing device, using a dedicated path not accessible to an external entity, without separate, complicated and time consuming user intervention, and without exposing the shared code or shared secret. Further, because alignment between the light emitting port and the camera device may be easily and consistently maintained in the standby or storage position, an opening forming the light emitting port of the keyboard may be relatively small, and essentially imperceptible from an outside of the device, enhancing the overall aesthetic appearance of the device and essentially precluding any infiltration of foreign matter into the interior of the keyboard through the light emitting port.

As noted above, the positioning of the tablet and keyboard in the closed position creates a physically closed channel which prevents the light pulses from being externally observed. In order to confirm that the tablet 320 and keyboard 350 are in the closed position, and that the keyboard 350 and tablet 320 are associated with the same product family and thus appropriate for pairing, the keyboard 350 and the tablet 320 may each include at least one magnet in a specified location, or a plurality of magnets in a specified arrangement, that may be sensed by magnetic field sensing hall sensors included in the other of the keyboard or the tablet. The sensing of magnet(s) by the hall sensor(s) in a specified position may establish with some degree of certainty that the keyboard 350 and tablet 320 are associated with the same product family and thus appropriate for pairing, and also that the keyboard 350 and tablet 320 are in a closed position and pairing, using a bit stream generated by the light emitting device 400 in the manner described above, may be initiated.

For example, as shown in FIG. 4B, in some embodiments, one or more magnets 370 may be included in the tablet 320, positioned, for example, near the camera 328, with one or more sensors 375 included in the keyboard 350, positioned, for example, near the light emitting port 356, at a position corresponding to that of the magnet(s) 370 so that, when the tablet 320 and keyboard 350 are in the closed position shown in FIGS. 3D and 4B, when the sensor(s) 375 detect the magnet(s) 370 at a specific location the secure closed position of the tablet 320 and the keyboard 350 may be confirmed before transmitting from the light emitting device 400 to the camera 328. In some embodiments, one or more magnets 370A may be included at a hinge end of the tablet 320, with one or more sensors 375A included at the hinge end of the keyboard 350, at a position corresponding to that of the magnets 370A. In some embodiments, both the magnet(s) 370 and 370A and the sensor(s) 375 and 375A may be implemented to provide a more reliable confirmation of the secure closed position of the tablet 320 and keyboard 350. In some embodiments, only the magnet(s) 370 and sensor(s) 375 may be included, or only the magnet(s) 370A and sensor(s) 375A may be included. In some embodiments, the relative installations of the sensor(s) 375 and magnet(s) 370 may be reversed so that the sensor(s) 375 are included in the tablet 320 and the magnet(s) 370 are included in the keyboard. Similarly, in some embodiments, the relative installation of the sensor(s) 375A and magnet(s) 370A may be reversed so that the sensor(s) 375A are included in the tablet 320 and the magnet(s) 370A are included in the keyboard. Various different combinations and locations for the magnet(s) and sensor(s) may provide the desired confirmation of the secure closed position of the tablet 320 and keyboard 350.

In some embodiments, the light emitting device 400 will only generate and transmit the bit stream corresponding to the shared code or shared secret when the tablet 320 and the keyboard 350 are in the closed position, so that the shared code or shared secret cannot be observed or overheard externally, but rather is only transmitted via the closed channel defined by the light emitting port 356 and the alignment of the light emitting port 356 with the camera 328. In some embodiments, the light emitting device 400 will only generate and transmit the bit stream corresponding to the shared code or shared secret when the closed position of the tablet 320 and the keyboard 350 is confirmed based on, for example, the sensing of the magnet(s) in specified position(s) by the hall sensor(s). In some embodiments, the light emitting device 400 will only generate and transmit the bit stream corresponding to the shared code or shared secret when the closed position of the tablet 320 and the keyboard 350 is confirmed based on, for example, a signal from locking mechanism establishing and maintaining a fixed position of the tablet 320 relative to the keyboard 350.

Figure 5A:
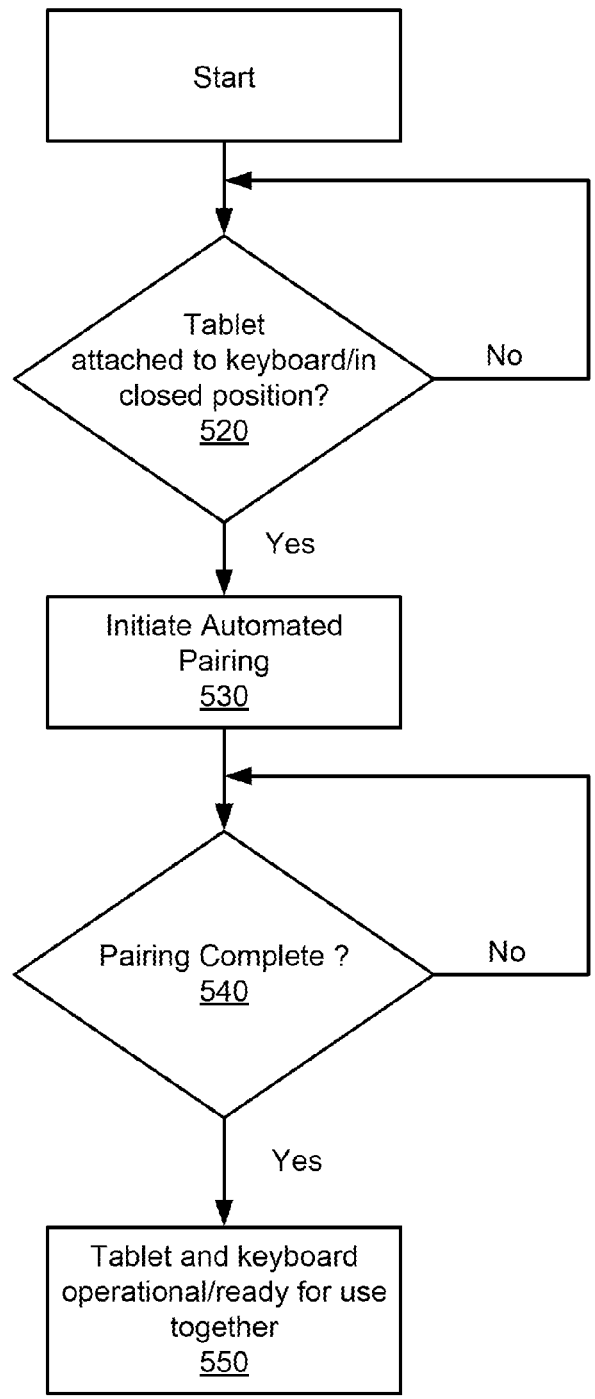
FIGS. 5A and 5B are flowcharts of a method for secure pairing of devices using a light augmented pairing system, in accordance with embodiments as broadly described herein.
Figure 5B:
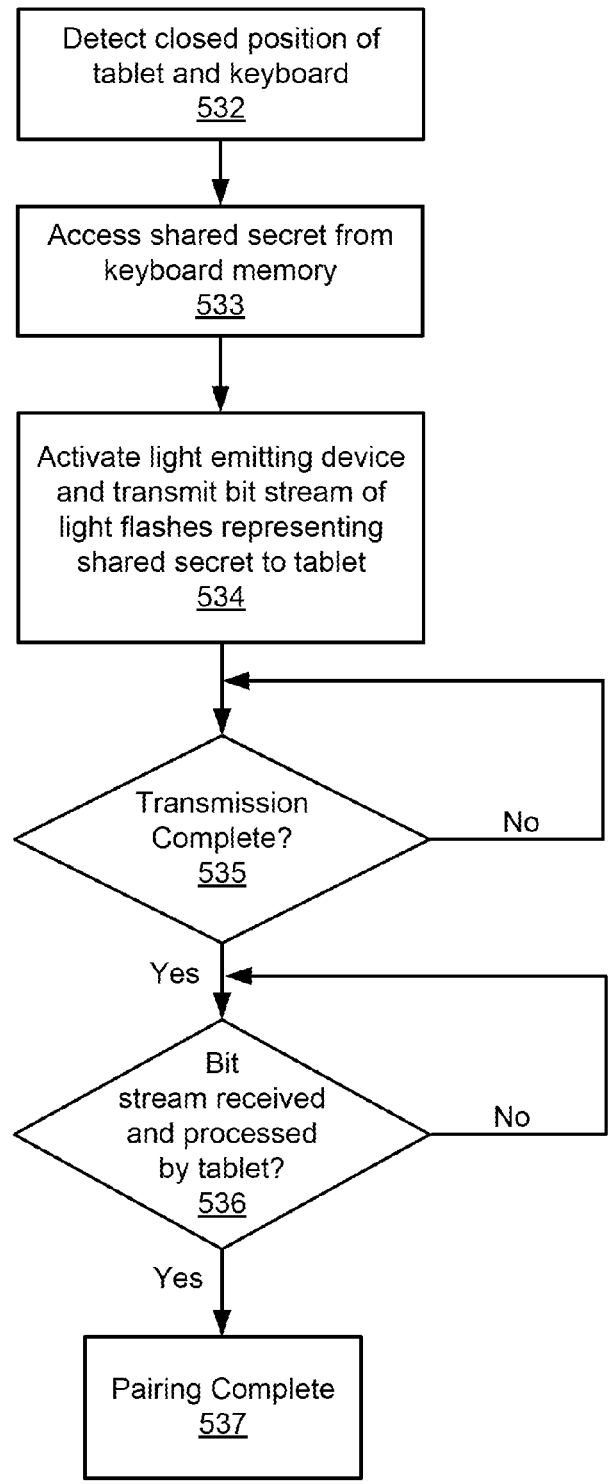

A process for secure pairing of devices using a light augmented pairing system, in accordance with embodiments as broadly described herein, is shown in FIGS. 5A and 5B. As noted above, simply for ease of explanation and illustration, the method shown in FIGS. 5A and 5B is applied to a tablet computing device, and in particular to the pairing of a tablet and a keyboard. However, similar methods may be applied to other types of computing devices, such as, for example, laptop computing devices capable of pairing with other peripheral devices, smartphone computing devices capable of pairing with other peripheral devices, and other such computing devices capable of pairing with other peripheral devices.

As shown in FIG. 5A, it is determined whether a tablet is attached to a keyboard and in a secure, closed position at block 520. As described above, in order to confirm that the tablet and keyboard are in the closed position, and that the keyboard and tablet are, for example, associated with the same product family, or otherwise established to be compatible, and thus appropriate for pairing, one or more magnetic field sensing hall sensor(s) included in one of the keyboard or the tablet may sense one or more magnet(s) in a specified position and/or arrangement included in the other of the keyboard or the tablet. When it is confirmed that the tablet is attached to the keyboard and in the secure, closed position, a pairing process is initiated at block 530. That is, the pairing process may be automatically initiated and carried out between the two devices, with no separate user intervention or interaction, upon confirmation that the devices are in the closed position and appropriate for pairing. When it is determined at block 540 that the pairing is complete, the tablet and keyboard may be operably connected/paired and ready for use. For example, upon completion of pairing, the tablet may be connected to the keyboard in the operation mode shown in FIG. 3B, so that the tablet may receive and register inputs entered on the keyboard by the user.

The pairing process carried out at block 530 of FIG. 5A is shown in more detail in FIG. 5B. Upon detecting that the tablet and keyboard are in the closed position and are of the same product family and thus appropriate for pairing at block 532, as described in detail above, a processor/controller of the keyboard may retrieve a shared code or shared secret from, for example, a memory or other storage device accessible to the processor of the keyboard, at block 533. After retrieving the shared code or shared secret, the processor/controller may activate the light emitting device provided in the keyboard at block 534, and controls the light emitting device to flash in a pattern representing the shared code or shared secret, so as to transmit the shared code or shared secret from the keyboard to the tablet. The bit stream (the flashes of light generated by the light emitting device representing the shared code or shared secret) is received by the camera device of the tablet. The tablet then compares the received code or secret with a code or secret stored in its memory. If the received code or secret matches a code or secret stored in the memory of the tablet, pairing is initiated. If the received code or secret does not match a code or secret stored in the memory of the tablet, pairing is not initiated. When it is determined, at block 535, that the transmission in this manner of the shared code or shared secret is complete, and that, at block 536, the complete bit stream has been transmitted from the keyboard and received and processed by the tablet, pairing between the two devices is established and completed at block 537.

As noted above, a system for secure device pairing is described above in an example implementation including a tablet computing device, simply for ease of explanation and illustration. However, the principles of a light augmented system for secure device pairing, as embodied and broadly described herein, may be applied to other types of computing devices, such as, for example, a laptop computing device, a convertible computing device, a smartphone computing device capable of pairing and interfacing with other peripheral devices, and other such computing devices.

For example, if instead of a tablet device, the keyboard were to be paired with a smartphone computing device, a camera, for example, an outward facing camera, of the smartphone computing device may be aligned with the light emitting device of the keyboard in the manner described above. That is, the smartphone computing device may be positioned on the keyboard with its camera placed over the light emitting port of the keyboard (e.g., the smartphone computing device may be laid directly on the keyboard), so that pairing of the smartphone computing device with the keyboard may be securely carried out by transmitting the bit stream representing the shared code or shared secret in the form of flashes of light generated by the light emitting device provided in the keyboard as described above.

It is also noted that, in the example implementation described above, in which a tablet is securely paired with the keyboard, the light emitting device is included in the peripheral device (the keyboard) while the light receiving device (the camera device) is included in the tablet. However, the light emitting device could be included in the tablet (or other computing device), and the light receiving device could be included in the keyboard (or other peripheral device), and pairing could still be carried out securely, as described above.

A light augmented system and method for secure device pairing, as embodied and broadly described herein, may allow for a computing device, such as the example implementation of a tablet computing device described above, to operate securely with multiple different peripheral (keyboard) devices through automatic pairing between the computing device and peripheral device without complicated and/or time intensive user intervention. This may allow for rapid sharing and/or swapping of peripheral devices within different user groups all using products from associated product families.

Figure 6:
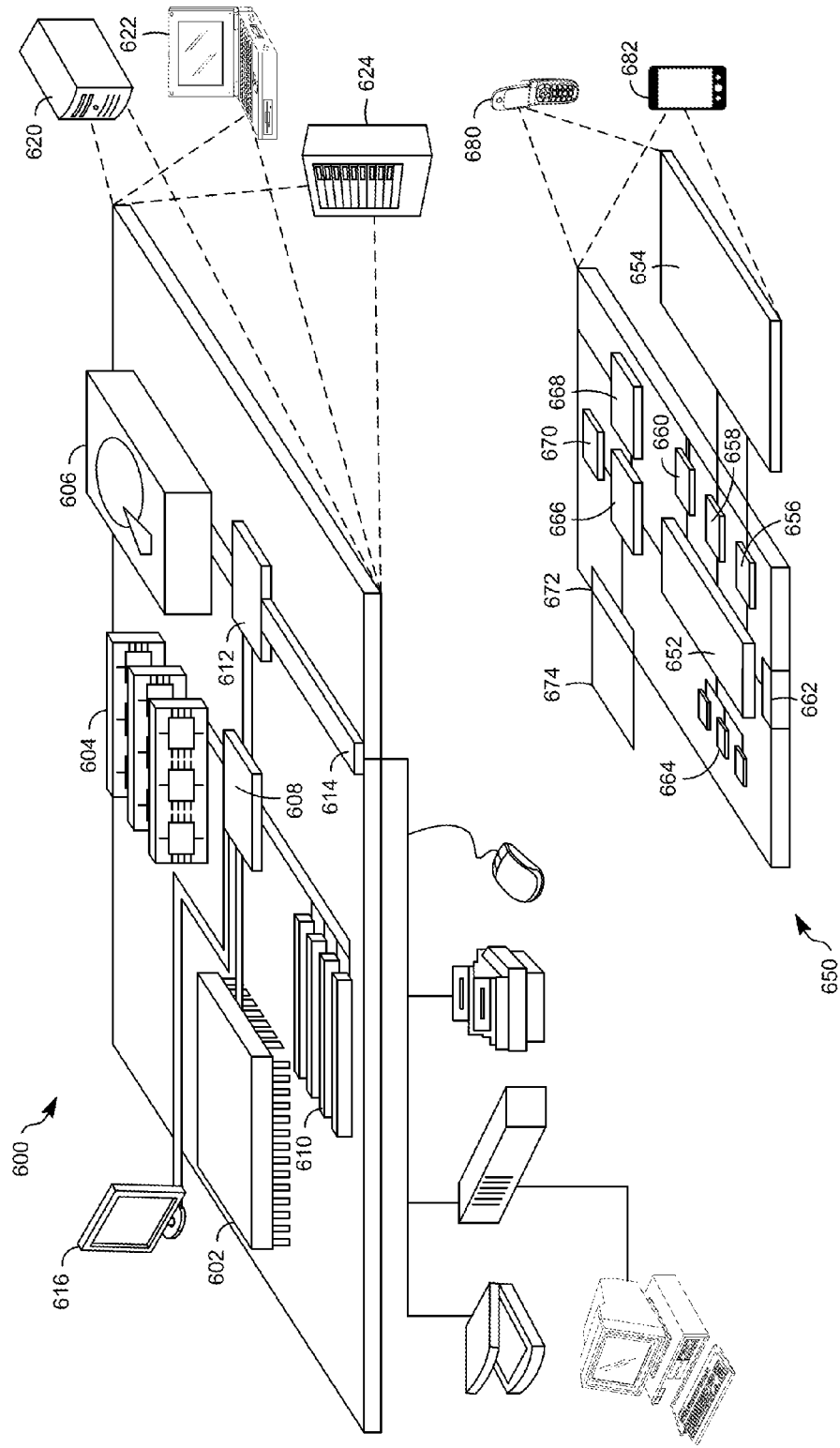
FIG. 6 illustrates an example of a computing device and a mobile computing device that can be used to implement the techniques described herein.

FIG. 6 shows an example of a generic computing device 600 and a generic mobile computing device 680, similar to the computing devices discussed above, illustrating some of the components of the respective computing devices. Computing device 600 is intended to represent various forms of digital computers, such as laptop computers, convertible computers, tablet computers, desktop computers, workstations, personal digital assistants, servers, blade servers, mainframes, and other appropriate computers. Computing device 680 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 800, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 680. Each of such devices may contain one or more of computing device 600, 680, and an entire system may be made up of multiple computing devices 600, 680 communicating with each other.

Computing device 680 includes a processor 682, memory 664, and an input/output device such as a display 684, a communication interface 666, and a transceiver 668, among other components. The device 680 may also be provided with a storage device, such as a microdrive or other device, to provide additional storage. Each of the components 680, 682, 664, 684, 666, and 668, are interconnected using various buses, and several of the components may be mounted on a common motherboard or in other manners as appropriate.

The processor 682 can execute instructions within the computing device 680, including instructions stored in the memory 664. The processor may be implemented as a chipset of chips that include separate and multiple analog and digital processors. The processor may provide, for example, for coordination of the other components of the device 680, such as control of user interfaces, applications run by device 680, and wireless communication by device 680.

Processor 682 may communicate with a user through control interface 688 and display interface 686 coupled to a display 684. The display 684 may be, for example, a TFT LCD (Thin-Film-Transistor Liquid Crystal Display) or an OLED (Organic Light Emitting Diode) display, or other appropriate display technology. The display interface 686 may comprise appropriate circuitry for driving the display 684 to present graphical and other information to a user. The control interface 688 may receive commands from a user and convert them for submission to the processor 682. For example, the control interface 688 may receive in input entered by a user via, for example, the keyboard 680, and transmit the input to the processor 682 for processing, such as, for entry of corresponding text into a displayed text box. In addition, an external interface 662 may be provide in communication with processor 682, so as to enable near area communication of device 680 with other devices. External interface 662 may provide, for example, for wired communication in some implementations, or for wireless communication in other implementations, and multiple interfaces may also be used.

The memory 664 stores information within the computing device 680. The memory 864 can be implemented as one or more of a computer-readable medium or media, a volatile memory unit or units, or a non-volatile memory unit or units. Expansion memory 674 may also be provided and connected to device 880 through expansion interface 672, which may include, for example, a SIMM (Single In Line Memory Module) card interface. Such expansion memory 674 may provide extra storage space for device 680, or may also store applications or other information for device 680. Specifically, expansion memory 674 may include instructions to carry out or supplement the processes described above, and may include secure information also. Thus, for example, expansion memory 674 may be provide as a security module for device 880, and may be programmed with instructions that permit secure use of device 880. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 874, or memory on processor 682, that may be received, for example, over transceiver 668 or external interface 662.

Device 680 may communicate wirelessly through communication interface 666, which may include digital signal processing circuitry where necessary. Communication interface 66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 680, which may be used as appropriate by applications running on device 680.

Device 680 may also communicate audibly using audio codec 660, which may receive spoken information from a user and convert it to usable digital information. Audio codec 660 may likewise generate audible sound for a user, such as through a speaker, e.g., in a handset of device 680. Such sound may include sound from voice telephone calls, may include recorded sound (e.g., voice messages, music files, etc.) and may also include sound generated by applications operating on device 680.

The computing device 680 may be implemented in a number of different forms, as shown in the figure. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of pairing a first electronic device and a second electronic device, the method comprising:
    detecting the first electronic device at a secure pairing position with respect to the second electronic device;
    activating a light emitting device of the second electronic device and transmitting a pattern of light defining a bit stream of data corresponding to a secret code known by the first electronic device and the second electronic device, including emitting light at the light emitting device in one of a temporal pattern or in varying degrees of intensity to define the bit stream of data corresponding to the secret code;
    receiving the bit stream of data at a light receiving device of the of the first electronic device, the light receiving device being directly aligned with the light emitting device; and
    pairing the first electronic device and the second electronic device upon confirmation by the first electronic device that the bit stream of data transmitted by the light emitting device of the second electronic device corresponds to the secret code known by the first electronic device.

2. The method of claim 1, wherein detecting the first electronic device at a secure pairing position with respect to the second electronic device includes:
    detecting, with at least one hall sensor included in one of the first electronic device or the second electronic device, at least one magnet included in the other of the first electronic device or the second electronic device, at a prescribed location of the other of the first electronic device or the second electronic device.

3. The method of claim 2, wherein detecting the first electronic device at a secure pairing position with respect to the second electronic device also includes:
    confirming, based on the detection of the at least one magnet at the prescribed location by the at least one hall sensor, that the first electronic device and the second electronic device are authorized for pairing.

4. The method of claim 2, wherein detecting the first electronic device at a secure pairing position with respect to the second electronic device also includes:
    confirming, based on the detection of the at least one magnet at the prescribed location by the at least one hall sensor, that the light receiving device of the first electronic device is directly aligned with the light emitting device of the second electronic device.

5. The method of claim 4, wherein confirming that the light receiving device of the first electronic device is directly aligned with the light emitting device of the second electronic device includes confirming that a light receiving port of the light receiving device of the first electronic device is positioned directly against a light emitting port of the light emitting device of the second electronic device.

6. The method of claim 5, wherein activating a light emitting device of the second electronic device and transmitting a pattern of light defining a bit stream of data corresponding to a secret code known by the first electronic device and the second electronic device includes:
    transmitting the pattern of light emitted by the light emitting device to the light receiving device of the first electronic device along a dedicated path accessible by only the first electronic device and the second electronic device.

7. A computing system including a plurality of electronic devices configured to be selectively paired, the system comprising:
    a computing device and a peripheral device configured to be selectively paired;
    a light emitting device included in the peripheral device;
    a light receiving device included in the computing device;
    at least one magnet included in one of the peripheral device or the computing device;
    at least one sensing device included in the other of the peripheral device or the computing device; and
    a controller included in at least one of the computing device or the peripheral device,
    wherein the controller is configured to initiate a pairing operation between the computing device and the peripheral device in response to detection, by the at least one sensing device, of the at least one magnet at a prescribed location, indicating a secure pairing position of the computing device with respect to the peripheral device, wherein,
    in the secure pairing position, the positioning of the light receiving device of the computing device directly against a terminal end of a light emitting port of the peripheral device forms a dedicated path for light transmitted from the light emitting device to the light receiving device that is only accessible by the peripheral device and the computing device.

8. The system of claim 7, wherein the peripheral device includes:
a housing, the light emitting device being received within the housing, and the light emitting port extending through a surface of the housing, at a position corresponding to a light emitting path of the light emitting device.

9. The system of claim 8, wherein, in the secure pairing position, a light receiving port of the light receiving device of the computing device is directly aligned with the light emitting port of the peripheral device.

10. The system of claim 9, wherein, in the secure pairing position, a proximal end of the light emitting port is directly aligned with the light emitting device, and a terminal end of the light emitting port is directly aligned with the light receiving port of the light receiving device of the computing device.

11. The system of claim 8, wherein, in the secure pairing position, a light receiving port of the light receiving device of the computing device is positioned directly against a terminal end of the light emitting port, the terminal end of the light emitting port being at an external surface of the housing of the peripheral device.

12. The system of claim 11, wherein, in the secure pairing position, the light emitting device is configured to emit light in a predetermined pattern through the light emitting port to the light receiving port of the light receiving device of the computing device, the predetermined pattern defining a bit stream of data corresponding to a secret code known by the computing device and the peripheral device, and wherein the computing device and the peripheral device are configured to be paired upon confirmation that the bit stream of data received by the light receiving device corresponds to the secret code known by the computing device.

13. The system of claim 8, wherein the computing device is a tablet computing device, and the peripheral device is a keyboard, and
wherein, in the secure pairing position, the tablet and the keyboard are in a closed position, with a display surface of the tablet facing a mating surface of the keyboard, and a front face of a camera at the display surface of the tablet positioned adjacent to a terminal end of the light emitting port at the mating surface of the keyboard such that light emitted by the light emitting device can only be received by the camera of the tablet, and
wherein, in the secure pairing position, the light emitting device is configured to emit light in a predetermined pattern through the light emitting port to camera of the tablet, the predetermined pattern defining a bit stream of data corresponding to a secret code known by the tablet and the keyboard for pairing of the tablet and the keyboard.

14. The system of claim 13, wherein the predetermined pattern of light emitted by the light emitting device includes at least one of intermittent flashes of light varying temporally over a period of time, or varying intensities of light emitted over a period of time.

15. A non-transitory computer-readable storage medium storing instructions that, when executed by a processor, cause the processor to perform a process to:
detect that a computing device is in a secure closed position with respect to a peripheral device; and
initiate a pairing process between the computing device and the peripheral device, including:
receive a pattern of light from the peripheral device, the pattern of light defining a bit stream of data corresponding to a secret code known by the peripheral device, the pattern of light including at least one of intermittent flashes of light varying temporally over a period of time, or varying intensities of light emitted over a period of time;
compare the received secret code to one or more secret codes stored in a memory of the computing device; and
pair the peripheral device and the computing device upon confirmation by the computing device that the secret code transmitted by the peripheral device corresponds to one of the one or more secret codes stored in the memory of the computing device.

16. The non-transitory computer-readable storage medium of claim 15, wherein the peripheral device includes a light emitting device configured to generate the pattern of light and to transmit the pattern of light through a light emitting port of the peripheral device to a light receiving port of the computing device positioned adjacent to the light emitting port in the secure closed position.

17. The non-transitory computer-readable storage medium of claim 15, wherein at least one hall sensor included in one of the computing device or the peripheral device is configured to detect at least one magnet included in the other of the computing device or the peripheral device to confirm that the computing device and the peripheral device are in the secure closed position.

18. A method of pairing a first electronic device and a second electronic device, the method comprising:
detecting the first electronic device at a secure pairing position with respect to the second electronic device, including:
detecting, with at least one hall sensor included in one of the first electronic device or the second electronic device, at least one magnet included in the other of the first electronic device or the second electronic device, at a prescribed location of the other of the first electronic device or the second electronic device; and
confirming, based on the detection of the at least one magnet at the prescribed location by the at least one hall sensor, that the light receiving device of the first electronic device is directly aligned with the light emitting device of the second electronic device;
activating a light emitting device of the second electronic device and transmitting a pattern of light defining a bit stream of data corresponding to a secret code known by the first electronic device and the second electronic device;
receiving the bit stream of data at a light receiving device of the first electronic device, the light receiving device being directly aligned with the light emitting device; and
pairing the first electronic device and the second electronic device upon confirmation by the first electronic device that the bit stream of data transmitted by the light emitting device of the second electronic device corresponds to the secret code known by the first electronic device.

* * * * *